United States Patent [19]
Fischer

[11] Patent Number: 5,699,318
[45] Date of Patent: Dec. 16, 1997

[54] TOPOGRAPHIC COMPOSITION SONAR MAP

[75] Inventor: Raymond C. Fischer, Denton, Md.

[73] Assignee: Northrop Grumman Corporation, Los Angeles, Calif.

[21] Appl. No.: 685,882

[22] Filed: Jul. 25, 1996

[51] Int. Cl.[6] .................................................. G01S 15/89
[52] U.S. Cl. ......................................... 367/88; 367/110
[58] Field of Search ................................. 367/88, 110, 7, 367/11; 345/22; 348/163

[56] References Cited

U.S. PATENT DOCUMENTS 4,088,979  5/1978  Jones et al. ........................... 367/110
5,309,409  5/1994  Jones et al. ........................... 367/103

*Primary Examiner*—Daniel T. Pihulic
*Attorney, Agent, or Firm*—Walter G. Sutcliff

[57] ABSTRACT

A video display of the bottom of a body of water uses three types of data collected from a side looking sonar system, and includes: imagery composed of highlights and shadows from the topography of the bottom; backscattering signal strength proportional to the marine bottom composition, i.e. sand, mud, gravel; and contour lines for water depth. A black and white, gray scale image of the bottom is generated, and a color overlay screen of the composition of the bottom is integrated with the black and white image, with the colors being coded to indicate composition. The water depth is also plotted in contour lines on the display.

33 Claims, 4 Drawing Sheets

TOPOGRAPHIC COMPOSITION SONAR MAP

BACKGROUND OF THE INVENTION

1. Field of the Invention

This invention relates generally to sonar apparatus and more particularly to side looking sonar apparatus for generating a topographic map of the bottom of a body of water.

2. Description of the Prior Art

Side looking sonar (SLS) systems since the early 1960's have been developed and improved so as to enhance the image quality for operator detection classification of objects on a marine bottom. This involves normalization of the image background, i.e. the bottom, which makes the image stand out; however, information is lost as to the composition of the sea floor. Thus an operator's ability to understand why a sonar image appears as it does it lost in that an object detected can be partially buried in a mud bottom, well defined on a sandy bottom, or exhibits a jagged outline due to the fact that it rests on a gravel bottom.

SUMMARY

Accordingly, it is an object of the present invention to provide an improvement in sonar imaging.

It is another object of the present invention to provide an improvement in the detection and classification of objects on a marine bottom.

It is a further object of the invention to generate a mosaic map of the marine bottom using a side looking sonar system.

It is yet another object of the invention to provide a sonar map of a marine bottom which provides information as to the topographic features and composition of the marine bottom.

The foregoing and other objects of the invention are achieved by generating a video display of the bottom of a body of water using three types of data collected from a side looking sonar (SLS) system namely: (1) imagery composed of highlights and shadows from the topography of the bottom, (2) backscattering signal strength proportional to the marine bottom composition, i.e. sand, mud, gravel; and (3) contour lines for water depth. In addition to a black and white, gray scale image of the bottom being generated, a color overlay screen of the composition of the bottom is integrated with the black and white image, with the colors being coded to indicate composition. Also, water depth is plotted in contour lines on the display so that a composite map of the marine bottom is generated showing microtopography, bottom composition and water depths.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow in the accompanying drawing which is given by way of illustration only and is thus not limitative of the present invention, and wherein.

DETAILED DESCRIPTION OF THE PREFERRED EMBODIMENTS

Figure 1:
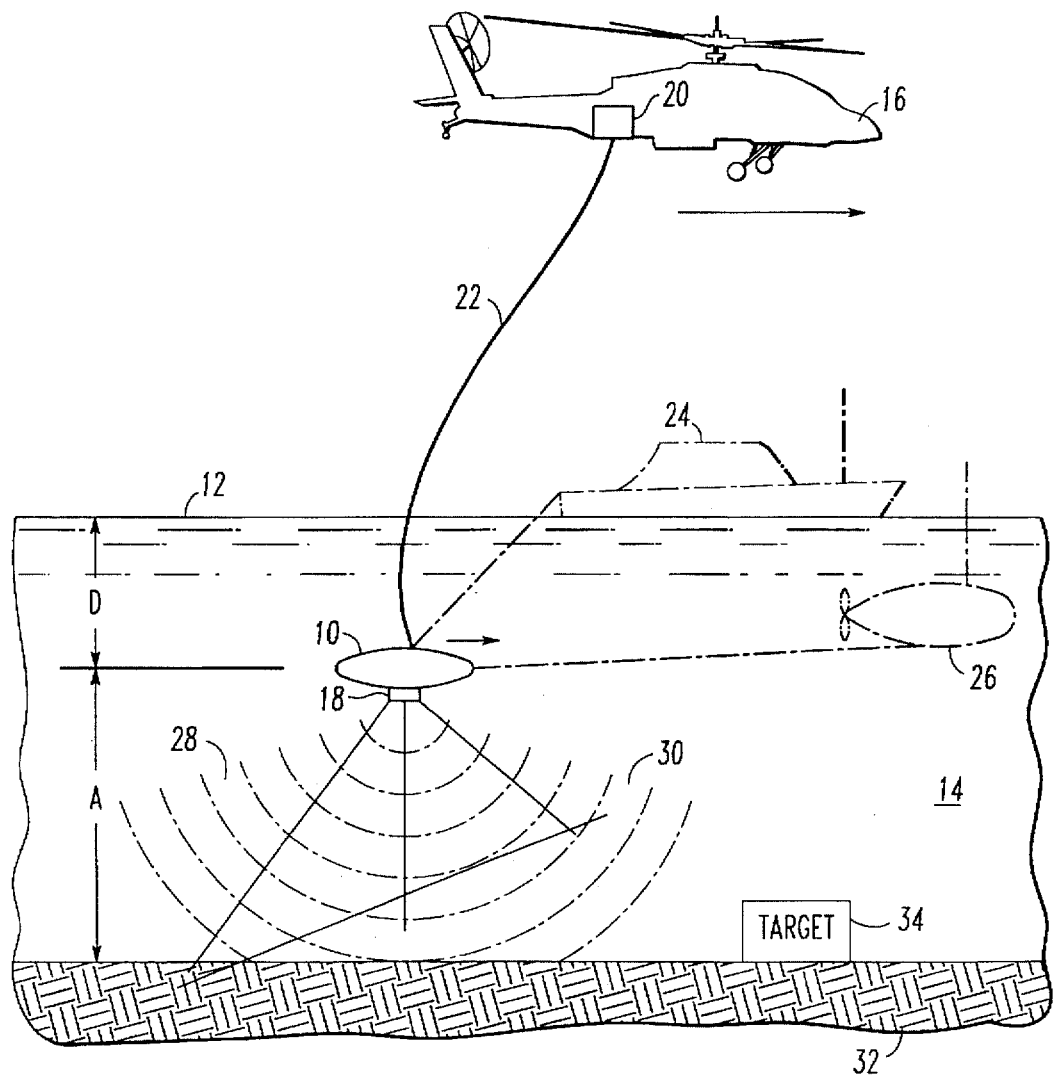
FIG. 1 is a diagram helpful in understanding the subject invention.

Referring now to the drawings wherein like reference numerals refer to like parts throughout, reference is first made to FIG. 1. There a towed vehicle 10 located under the surface 12 of a body of water 14 is being towed by an airborne towing vehicle 16 which may be, for example, a helicopter or the like. The towed underwater vehicle 10 includes an onboard side looking sonar (SLS) system 18 which is connected to sonar imaging apparatus 20 located onboard the towing vehicle 16 via an electrical cable assembly 22. Although the towing vehicle 16 is shown in FIG. 1 comprising an airborne platform, when desirable it may comprise, as depicted in phantom, a surface vehicle 24 or an other submerged vehicle 26 operating either under its own control or by remote control.

The SLS system 18 propagates and receives two separate sonar return signals 28 and 30 from the marine bottom 32 in search of one or more targets 34 resting on or partially or fully submerged on the bottom 32. When using an SLS system, two images, one for each of the signals 28 and 30, are generated along the path of travel over the marine bottom 32 which appears, for example, as port and starboard images 36 and 38 shown in FIG. 5 and which is separated by a dead zone 40 which occurs directly beneath the towed vehicle 10.

The principal objective of the subject invention is to not only detect target(s) 34 on the marine bottom 32 and display water depth, but also to display the topography and composition of the bottom 32, i.e. whether it is comprised of mud, sand, mud/sand or gravel. The solution is provided by apparatus shown in FIGS. 2 and 6.

Figure 2:
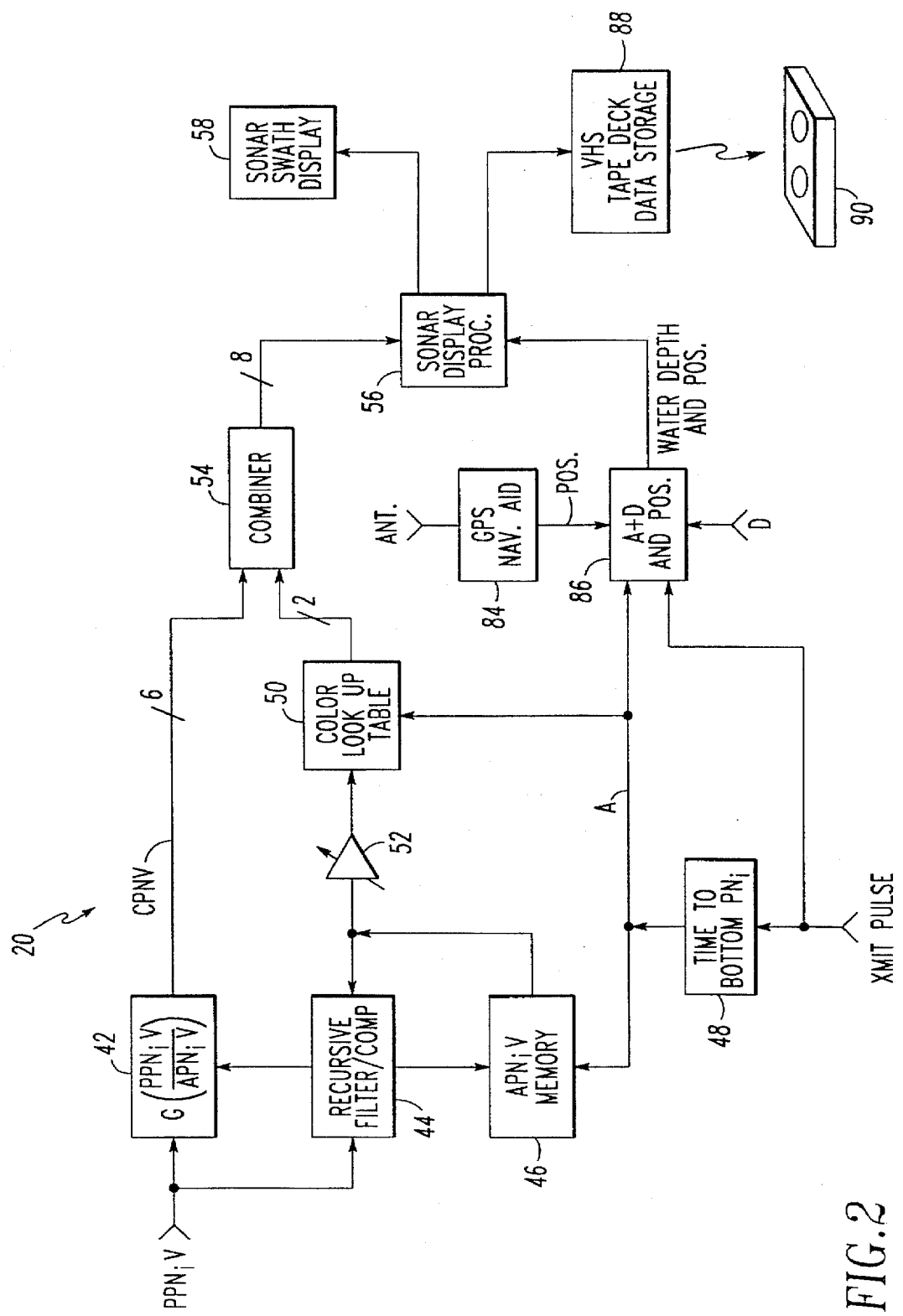
FIG. 2 is an electrical block diagram illustrative of the preferred embodiment of apparatus for generating a sonar swath display of a marine bottom in real time.
Figure 5:
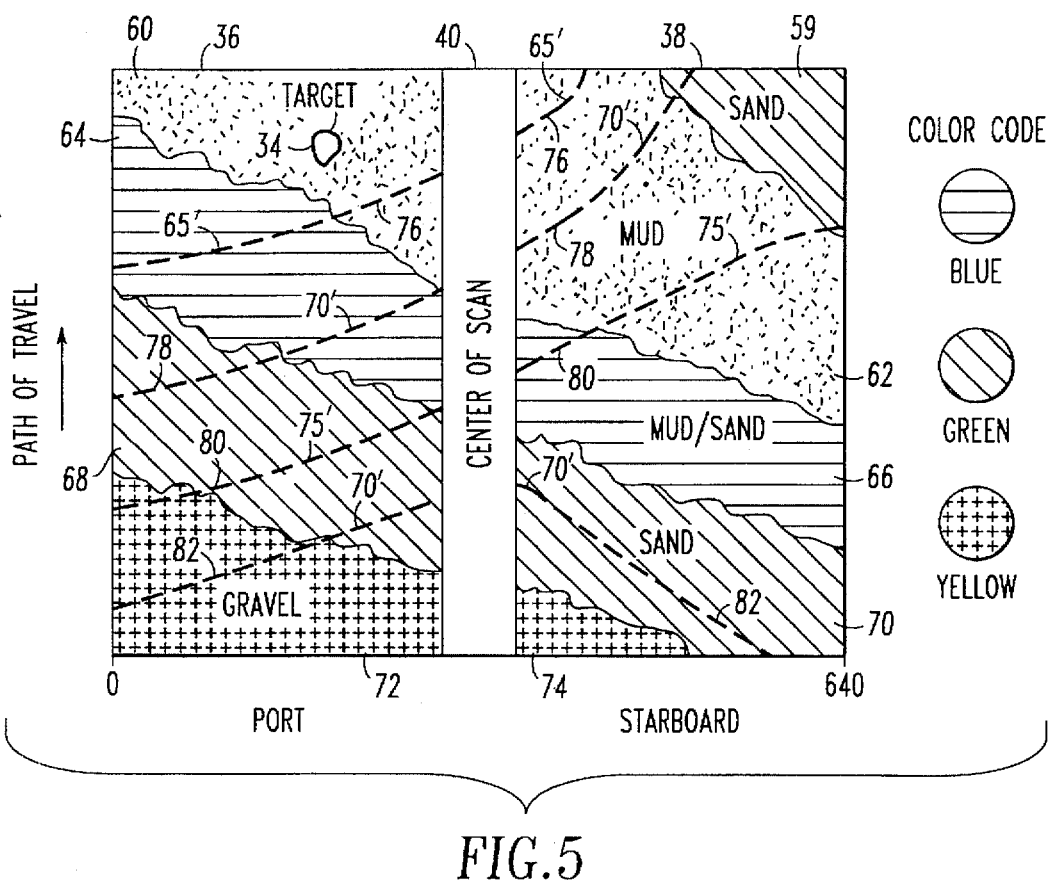
FIG. 5 is a diagram illustrative of a sonar display generated in accordance with the subject invention.

Referring now to FIG. 2, shown thereat is digital signal processing apparatus which consecutively operates on a plurality of image pixel signals P to generate a 640 pixel/line sonar image display such as shown in FIG. 5. Each pixel P has a number N and a signal value V. Accordingly, each pixel number value PNV is fed to a functional block 42 as a signal $PPN_iV$ which stands for "present pixel number value of the ith term". The block 42 comprises a digital circuit having a transfer function of $G \times (PPN_iV/APN_iV)$. The output of the signal block 42 comprises a compensated pixel number value signal CPNV which comprises the ratio of the present $(PPN_iV)$ and past average value $(APN_iV)$ of the ith pixel number $N_i$. The average value term $APN_iV$ is derived from a recursive digital filter and compensator signal block 44 and a digital memory 46. The memory 46 operates to store the average value of a sequence of pixel numbered values generated by the recursive filter 44 which receives each pixel value signal $PPN_iV$ as it is being fed to the functional block 42. The average value of each pixel $APN_iV$ is fed back through the recursive filter 44 to the signal block 42 where it is used in determining the ratio of $PPN_iV/APN_iV$. A ratio value signal CPNV comprising image data is output from the signal block 42, for example, comprises a six bit digital signal which is used to form a conventional black and white, gray scale, sonar swath image as will be explained.

Figure 3:
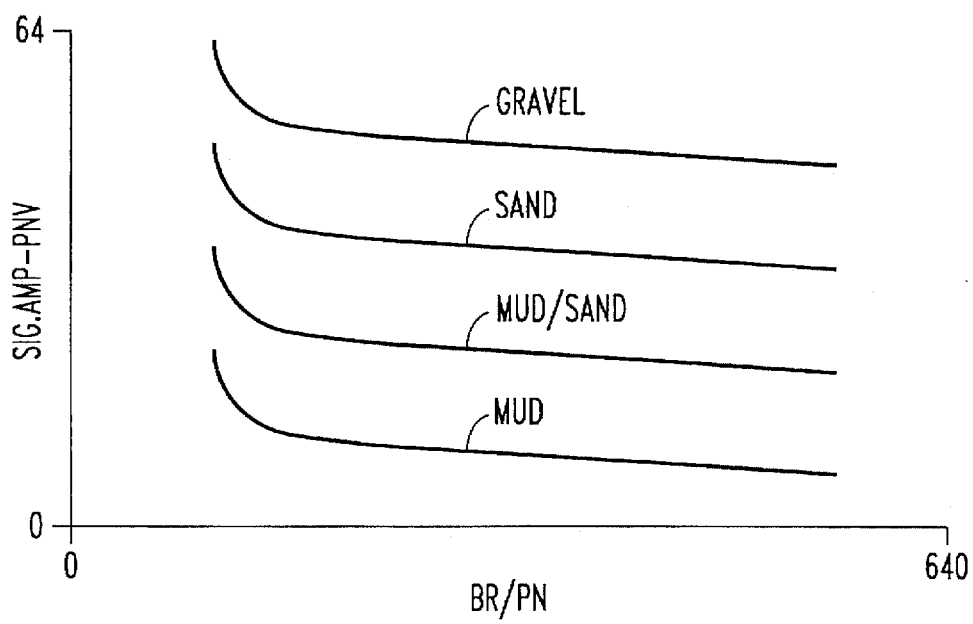
FIG. 3 is a graph illustrative of the bottom signal strength of signals received for various compositions of materials sensed during a sonar imaging of a marine bottom in accordance with the subject invention.
Figure 4:
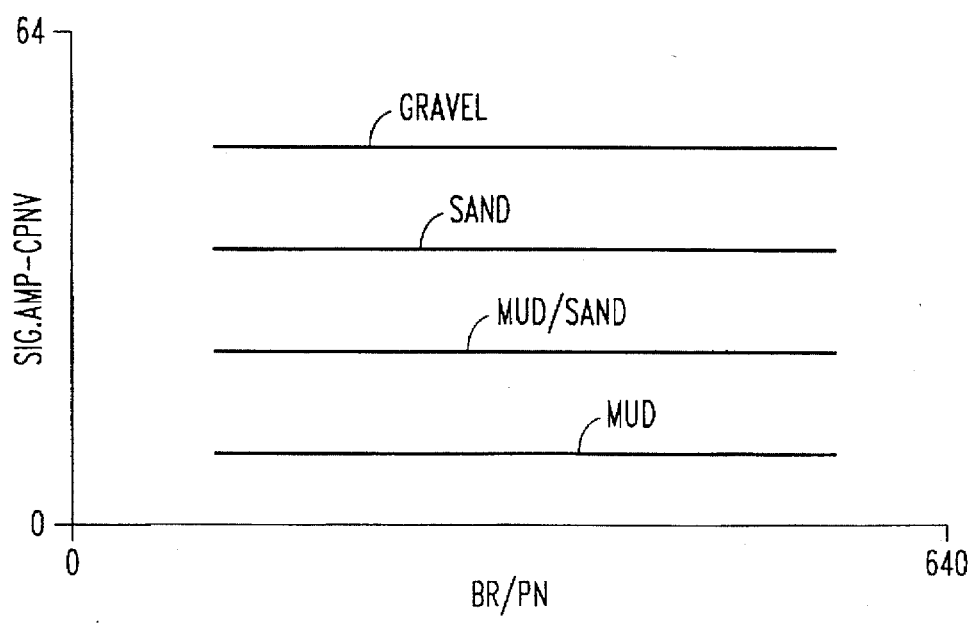
FIG. 4 is a graph illustrative of the normalized signal strength of materials shown in FIG. 3.

FIG. 3 depicts a graph indicating the signal strength of bottom returns PNV received from different bottom compositions over the width BR (bottom range) of a sonar image pixels PN. The graph indicates a relatively strong bottom signal strength is received for a gravel bottom, while for mud/sand and mud, relatively weaker signal strengths are received. The signal block 42 in effect normalizes the signal strength values PNV which are shown in FIG. 4 as CPNV vs. BR/PN.

Further as shown in FIG. 2, each average pixel number value $APN_iV$ for a sequence of pixels numbering between 0 and 640, for example, are fed out from the memory 46 in response to timing signal generated by a time to bottom functional block 48 for each pixel number $PN_i$ which receives a trigger corresponding to each ith sonar transmit (XMIT) pulse.

The signal strength, i.e. amplitude values $APN_iV$ accordingly are fed out of the memory 46 to a color look-up table 50 through a signal amplifier 52. Synchronism is provided by the timing signal output from the time to bottom functional block 48. Accordingly, the color look up table 50 outputs sea floor composition data as a two bit digital signal which can designate one of four colors indicative of four different bottom compositions as noted in the Truth Table shown below.

TRUTH TABLE

| Dig. Value | Color | Bottom Composition |
| --- | --- | --- |
| 00 | — | Mud |
| 01 | Blue | Mud/Sand |
| 10 | Green | Sand |
| 11 | Yellow | Gravel |

The two bit composition data from the look-up table 50 is combined with the six bit image data in a digital combiner circuit 54 where a composite eight bit digital output signal is fed to the sonar display digital processor 56 coupled to a sonar display unit 58 where a color overlay of the bottom composition is provided in addition to the normal black and white sonar image such as shown in FIG. 5. Referring now to FIG. 5, the Port and Starboard halves 36 and 38 of the SLS image, in addition to providing an indication of the bottom topography and the presence of a target 34 shown in the port side image portion 36, indicates In the upper right hand side of the starboard image portion 38, a region of sand 59 which is green in color. In the two adjacent sections 60 and 62 of the port and starboard side image portions 36 and 38 are clear (no color), indicating that a mud bottom composition is located thereat. Below this is a section consisting of mud/sand which is indicated by blue colored areas 64 and 66. Beneath this is an area having a sand composition and which is again indicated by the two green sections 68 and 70. Finally, areas 72 and 74 of the bottom having a gravel composition is shown having a yellow color overlay.

In addition to the color overlays which are intended to reveal marine bottom composition, the sonar display shown in FIG. 5 also displays water depth which is plotted as contour lines, for example the lines indicating depths of 65 feet, 70 feet and 75 feet as shown, and indicated by reference numerals 76, 78, 80 and 82.

As shown in FIG. 1, water depth is determined from a summation of two measured parameters D and A where D is equal to the depth of the towed vehicle beneath the surface 12 as shown in FIG. 1, while A is equal to the towed vehicle altitude above the bottom 32. These two components of water depth are derived from the timed bottom determination block 48 and an indication of towed vehicle depth which is provided by a sensor, not shown, onboard the towed vehicle 10 (FIG. 1). The terms D and A are combined together with a signal corresponding to position or present location which is provided by a conventional global positioning system (GPS) shown by reference numeral 84. As shown in FIG. 2, a computational block 86 combines the terms A and D along with the position signal which then outputs a water depth and position signal to the sonar display processor 56.

The sonar display processor 56, shown in FIG. 2, in addition to generating signals for the sonar swath display unit 58, is also coupled to a VHS tape deck storage device 88 which includes a cassette 90. The cassette 90 is fed all the data used by the sonar display processor 56. This data is in strips, having a width equal to the sonar swath consisting of plural images of the port and starboard side image portions 36 and 38 of FIG. 5. The sonar swath may be a composite of a plurality of contiguous passes or a straight run. The desire is to combine sonar swath data from a large area to form a large scale mosaic type map. This is achieved by apparatus shown in FIG. 6.

Figure 6:
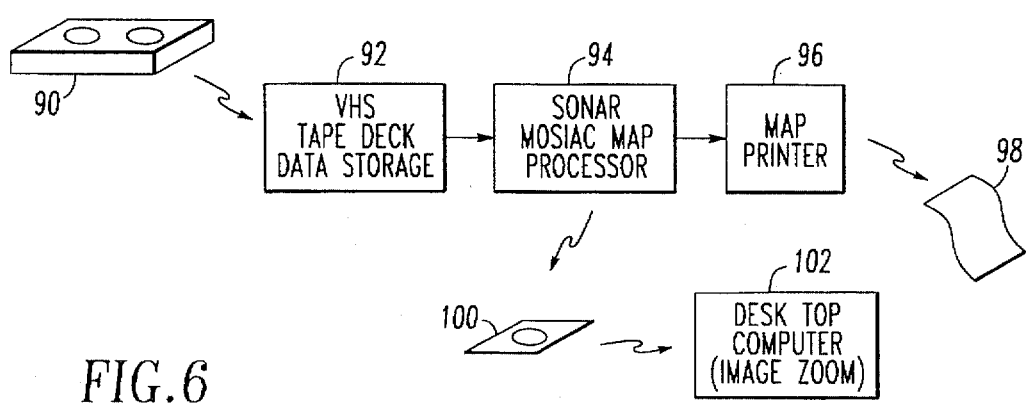
FIG. 6 is an electrical block diagram of apparatus for generating a mosaic map of the marine bottom data collected by the apparatus shown in FIG. 2.

Referring now to FIG. 6, the cassette 90 is replayed by a VHS tape deck 92 which is similar to or identical to the tape deck 88 shown in FIG. 2 where the data is downloaded into a sonar mosaic map processor 94. The output of the mosaic map processor 94 is coupled to a map printer 96 which generates a large scale map 98 of the sea bottom. The sonar mosaic map processor 94 also stores combined data in a map format on a compact data disc (CD) 100 which can then be played back on a desk top computer 102, for example, where the image scale can be adjusted to view a large area consisting of many combined sonar swaths or to view a single sonar resolution cell intensity.

Thus what has been shown and described is a SLS color coded bottom classification system which generates a small scale mosaic bottom topography along with imagery and bottom composition which is displayed as a color overlay and thus provides a significant improvement in the ability of operators to understand the quality of an image of a target when it is partially buried, for example, in a mud bottom or rests on a gravel bottom as opposed to being well defined when such target lies on a sandy bottom.

Having thus shown and described what is at present considered to be the preferred embodiments, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of generating a sonar image of a marine bottom, comprising the steps of:

(a) directing sonar signals to a predetermined area of a marine bottom;

(b) generating image signals of said sonar signals reflected back from the marine bottom;

(c) generating a black and white image of said marine bottom from said image signals;

(d) generating signals corresponding to the composition of said marine bottom in said predetermined area from the signal strength of said image signals;

(e) generating a color image of the composition of said marine bottom in response to said corresponding signals; and (f) generating a composite image of said marine bottom by superimposing said color image on said black and white image.

2. A method according to claim 1 wherein said step (b) of generating image signals comprises generating normalized image signals.

3. A method according to claim 2 wherein said normalized image signals of step (b) are generated by the additional step of:

(i) determining the present value of said image signals;

(ii) determining the average values of respective past image signals; and (iii) generating image signals corresponding to the ratio of the present value of said image signals to the average value of the past image signals.

4. A method according to claim 3 wherein said image signals comprise video signals.

5. A method according to claim 4 wherein said video signals comprise digital signals.

6. A method according to claim 5 wherein said color image includes different colors for different bottom compositions.

7. A method according to claim 5 wherein said different colors are generated in response to signals outputted from a color look-up table.

8. A method according to claim 3 and additionally comprising the step of:

(g) determining water depth in said predetermined area; and (h) including an indication of said water depth on said composite image.

9. A method according to claim 8 and additionally including the step of:

(i) determining the position of a vehicle directing said sonar signals to said bottom; and (j) referencing said composite image to the position of said vehicle.

10. A method according to claim 9 wherein said vehicle comprises an underwater vehicle.

11. A method according to claim 10 wherein said underwater vehicle comprises a towed vehicle.

12. A method according to claim 10 wherein said step (g) of determining water depth comprises the further steps of:

(iv) determining the depth of said towed underwater vehicle under the surface;

(v) determining the altitude of said towed underwater vehicle above the marine bottom; and (vi) summing the determined values of the depth and altitude of said towed underwater vehicle.

13. A method according to claim 12 and additionally including the steps of:

(h) storing data of at least one said composite image; and (i) generating a map of said composite image.

14. A method according to claim 12 and additionally including the steps of:

(h) storing data of a plurality of said composite images;

(i) downloading said data to a digital signal processor; and (j) generating a sonar map from the downloaded data.

15. A method according to claim 14 wherein said digital signal processor comprises a mosaic map processor.

16. A method according to claim 12 and additionally including the steps of:

(h) storing data of a plurality of said composite images;

(i) downloading said data to a sonar map processor; and (j) generating a sonar map on a computer screen.

17. Apparatus for generating a sonar image of a marine bottom, comprising:

(a) means for propagating sonar signals to and receiving said sonar signals reflected from a marine bottom;

(b) means for generating image signals of said sonar signals reflected from the marine bottom;

(c) means for generating a black and white image of said marine bottom from said image signals;

(d) means for generating signals corresponding to the composition of said marine bottom from the signal strength of said image signals;

(e) means for generating a color image of the composition of said marine bottom in response to said signals corresponding to signal strength; and (f) means for generating and displaying a composite image of said marine bottom and comprising an image including said color image overlaid on said black and white image.

18. Apparatus according to claim 17 wherein said means for generating said image signals comprises means for generating normalized image signals.

19. Apparatus according to claim 18 wherein said means for generating normalized image signals includes means for generating image signals corresponding to the ratio of the present value of said image signals to the average value of respective past image signals.

20. Apparatus according to claim 19 wherein said image signals comprise video signals.

21. A method according to claim 20 wherein said video signals comprise digital signals.

22. Apparatus according to claim 21 wherein said color image includes different colors for different bottom compositions.

23. Apparatus according to claim 21 wherein said means for generating a color image includes a color look-up table coupled to a digital memory having stored values of the average value of past image signals.

24. Apparatus according to claim 19 and additionally means for determining water depth and means for generating an indication of said water depth which is displayed together with said composite image.

25. Apparatus according to claim 24 and additionally a vehicle for supporting said means for propagating and receiving sonar signals.

26. Apparatus according to claim 25 and additionally including means for determining the position of said vehicle and referencing said composite image relative to the position of said vehicle.

27. Apparatus according to claim 26 wherein said vehicle comprises an underwater vehicle.

28. Apparatus according to claim 27 wherein said underwater vehicle comprises a towed vehicle.

29. Apparatus according to claim 28 and additionally including another vehicle for supporting said means for generating and displaying said composite image.

30. Apparatus according to claim 29 wherein said another vehicle comprises a towing vehicle.

31. Apparatus according to claim 30 and additionally including:
   (g) means for storing data of a plurality of said composite images;
   (h) means for downloading said stored data to a sonar signal processor; and
   (i) means coupled to said sonar signal processor for generating a sonar map from the stored data.

32. Apparatus according to claim 31 wherein said sonar signal processor comprises a sonar mosaic map processor.

33. Apparatus according to claim 30 and additionally including:
   (g) means for storing data of a plurality of said composite images;
   (h) means for downloading said data to a sonar mosaic map processor; and
   (i) computer means for generating a sonar mosaic map of said data.

* * * * *